(12) United States Patent
Artelsmair

(10) Patent No.: US 8,035,059 B2
(45) Date of Patent: *Oct. 11, 2011

(54) METHOD FOR CONTROLLING AND/OR ADJUSTING A WELDING PROCESS

(75) Inventor: Josef Artelsmair, Wartberg/Krems (AT)

(73) Assignee: Fronius International GmbH, Pettenbach (AT)

( * ) Notice: Subject to any disclaimer, the term of this patent is extended or adjusted under 35 U.S.C. 154(b) by 410 days.

This patent is subject to a terminal disclaimer.

(21) Appl. No.: 10/573,107

(22) PCT Filed: Oct. 21, 2004

(86) PCT No.: PCT/AT2004/000364
§ 371 (c)(1),
(2), (4) Date: Mar. 23, 2006

(87) PCT Pub. No.: WO2005/042200
PCT Pub. Date: May 12, 2005

(65) Prior Publication Data

US 2007/0102411 A1    May 10, 2007
US 2008/0290079 A9    Nov. 27, 2008

(30) Foreign Application Priority Data

Oct. 23, 2003 (AT) ................. A 1687/2003

(51) Int. Cl.
*B23K 9/00* (2006.01)
*B23K 9/12* (2006.01)
(52) U.S. Cl. .......... 219/130.21; 219/124.34; 219/137.71
(58) Field of Classification Search ............. 219/137.71, 219/124.34, 130.21
See application file for complete search history.

(56) References Cited

U.S. PATENT DOCUMENTS

| | | | |
|---|---|---|---|
| 2,906,859 A * | 9/1959 | Steele | 219/124.01 |
| 4,249,062 A * | 2/1981 | Hozumi et al. | 219/124.34 |
| 4,485,293 A | 11/1984 | Tabata et al. | |
| 4,533,817 A | 8/1985 | Maekimaa et al. | |
| 4,758,707 A * | 7/1988 | Ogilvie et al. | 219/130.51 |
| 5,225,660 A | 7/1993 | Mita et al. | |
| 5,317,116 A | 5/1994 | Tabata et al. | |
| 5,726,419 A | 3/1998 | Tabata et al. | |
| 6,963,048 B2 | 11/2005 | Huismann et al. | |

(Continued)

FOREIGN PATENT DOCUMENTS

DE    19 19 464    10/1969

(Continued)

OTHER PUBLICATIONS

Machine generated English translation of Japanese document No. JP11—58012A.*

(Continued)

*Primary Examiner* — Stephen Ralis
(74) *Attorney, Agent, or Firm* — Collard & Roe, P.C.

(57) ABSTRACT

The invention relates to a method for controlling and/or adjusting a welding process, using a melting welding wire (13) wherein after ignition of an electric arc, a welding process is carried out, the welding process being adjusted on the basis of several different welding parameters and being controlled or adjusted by a control device and/or welding current source. In order to determine the position of distance between the end of the welding wire (13) and the workpiece (16), which is to be processed, in a manner which is as accurate as possible, at least one mechanical adjustment process (41) is carried out during the welding process, enabling the position of said welding wire (13) being used as a sensor.

17 Claims, 5 Drawing Sheets

U.S. PATENT DOCUMENTS

| | | |
|---|---|---|
| 6,969,823 B2 | 11/2005 | Huismann et al. |
| 6,984,806 B2 | 1/2006 | Huismann et al. |
| 7,165,707 B2 | 1/2007 | Huismann et al. |
| 2005/0006363 A1* | 1/2005 | Hsu et al. ............... 219/130.01 |

FOREIGN PATENT DOCUMENTS

| | | |
|---|---|---|
| DE | 42 33 818 | 4/1994 |
| DE | 197 38 785 | 4/1999 |
| EP | 0774317 | 5/1997 |
| EP | 1 384 546 | 1/2004 |
| EP | 1 384 547 | 1/2004 |
| EP | 1 384 548 | 1/2004 |
| EP | 1 384 549 | 1/2004 |
| GB | 1 245 589 | 9/1971 |
| JP | 55014150 A * | 1/1980 |
| JP | 4270069 | 9/1992 |
| JP | 6170538 | 6/1994 |
| JP | 09-108836 | 4/1997 |
| JP | 11-019771 | 1/1999 |
| JP | 11-58012 A * | 3/1999 |
| JP | 11-138265 | 5/1999 |
| SU | 1 299 730 | 3/1987 |
| WO | WO 00/64620 | 11/2000 |

OTHER PUBLICATIONS

International Search Report.

International Search Report for PCT/AT2006/000066.

Kim, Tae-Jin et al., "Development of a power supply for the pulse MIG arc welding with the changes of output current polarity," The 30$^{th}$ Annual Conference of the IEEE Industrial Electronics Society, 2004, pp. 953-956.

Japanese Office Action dated Nov. 25, 2008 (with translation).

* cited by examiner

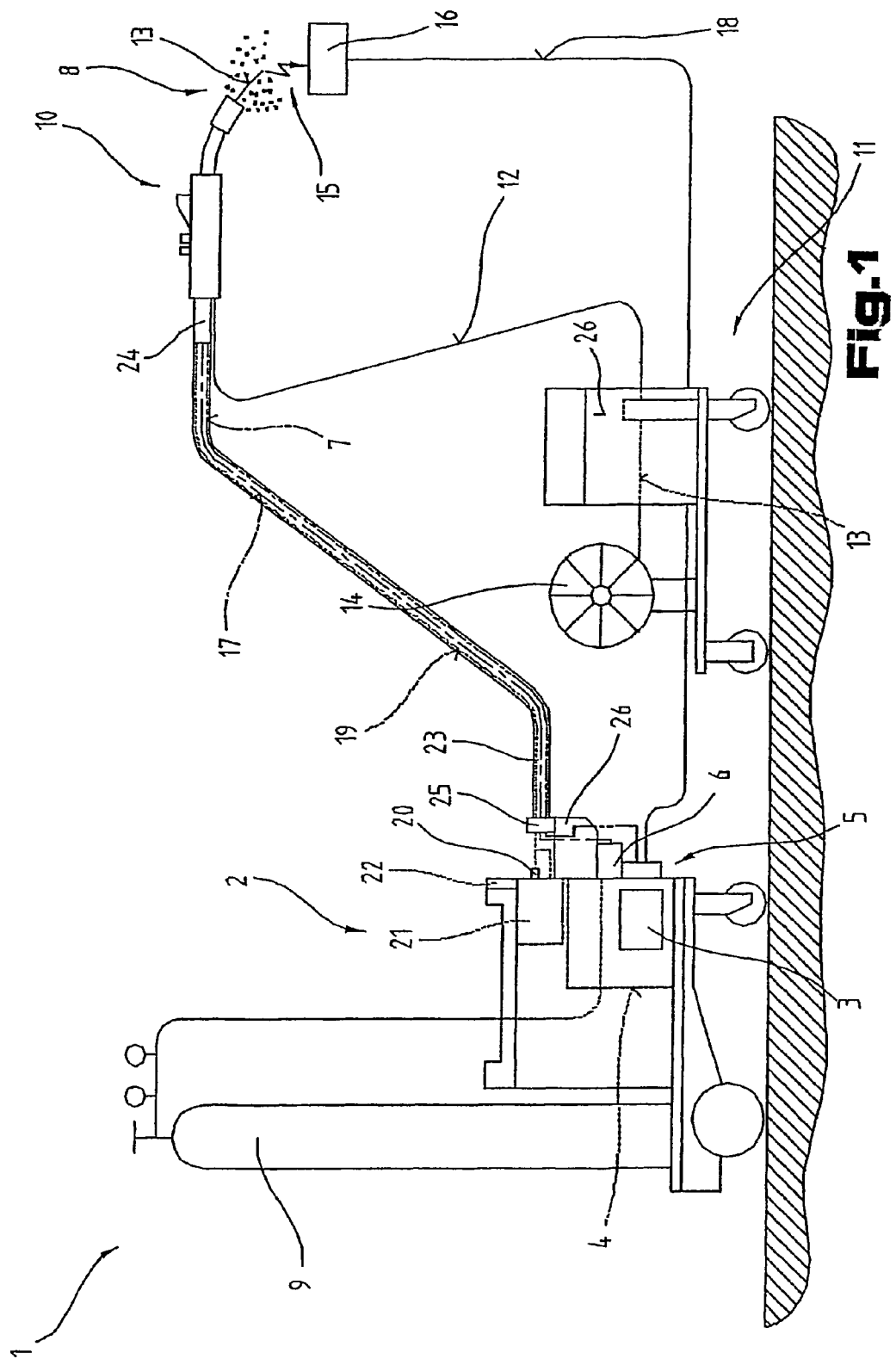

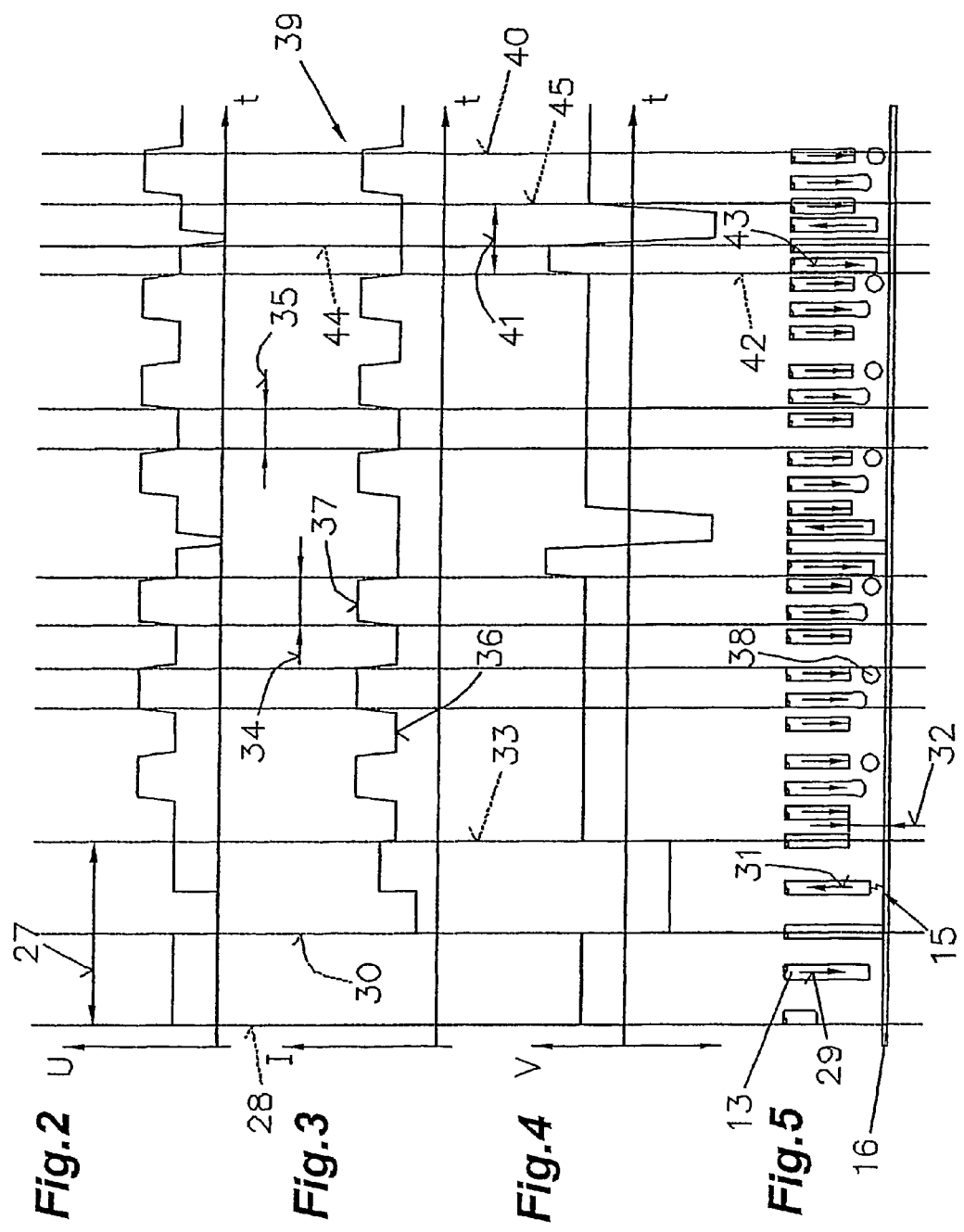

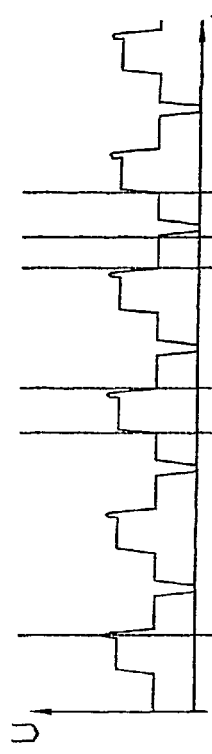
*Fig.6*
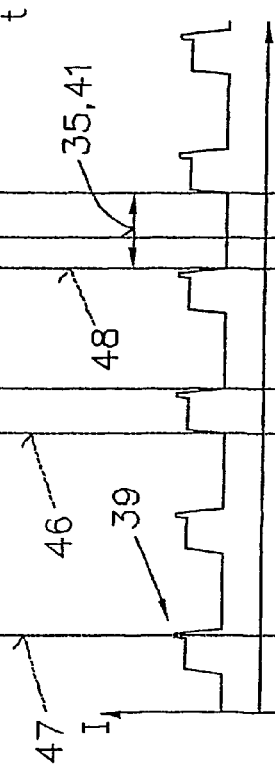
*Fig.7*
*Fig.8*
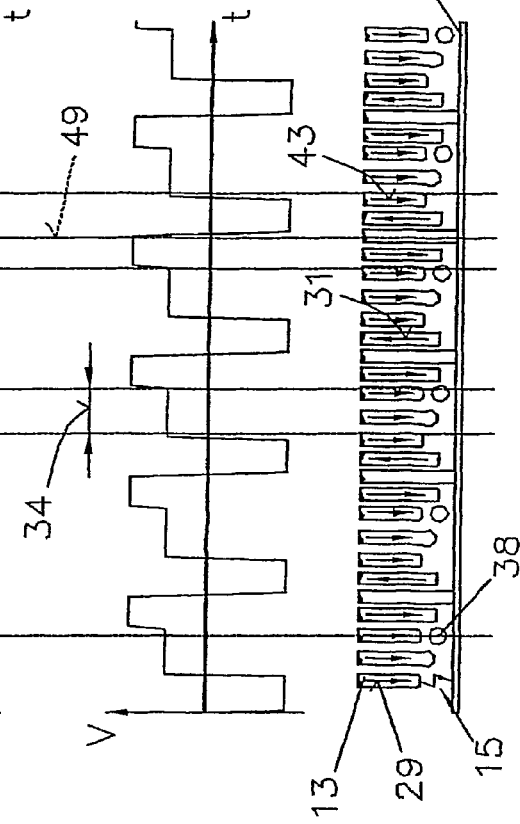
*Fig.9*

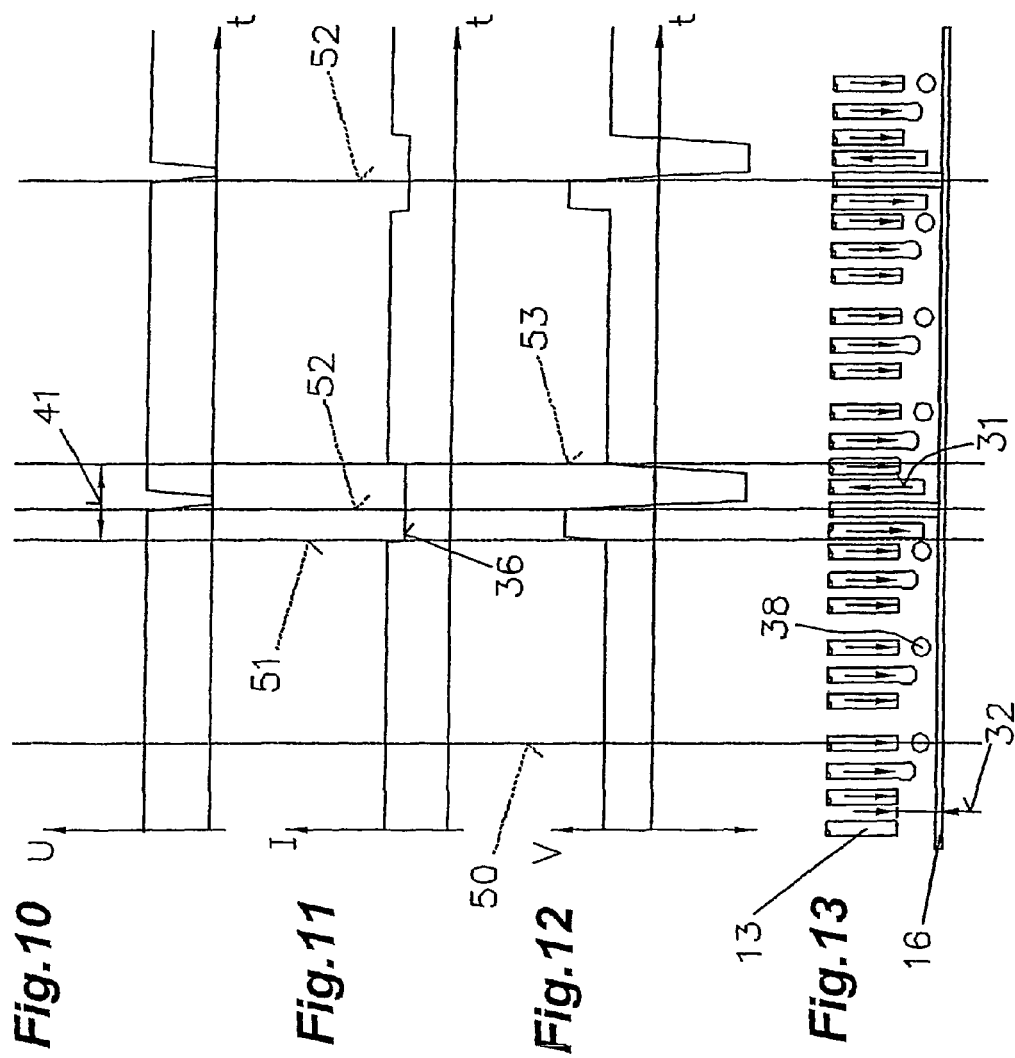

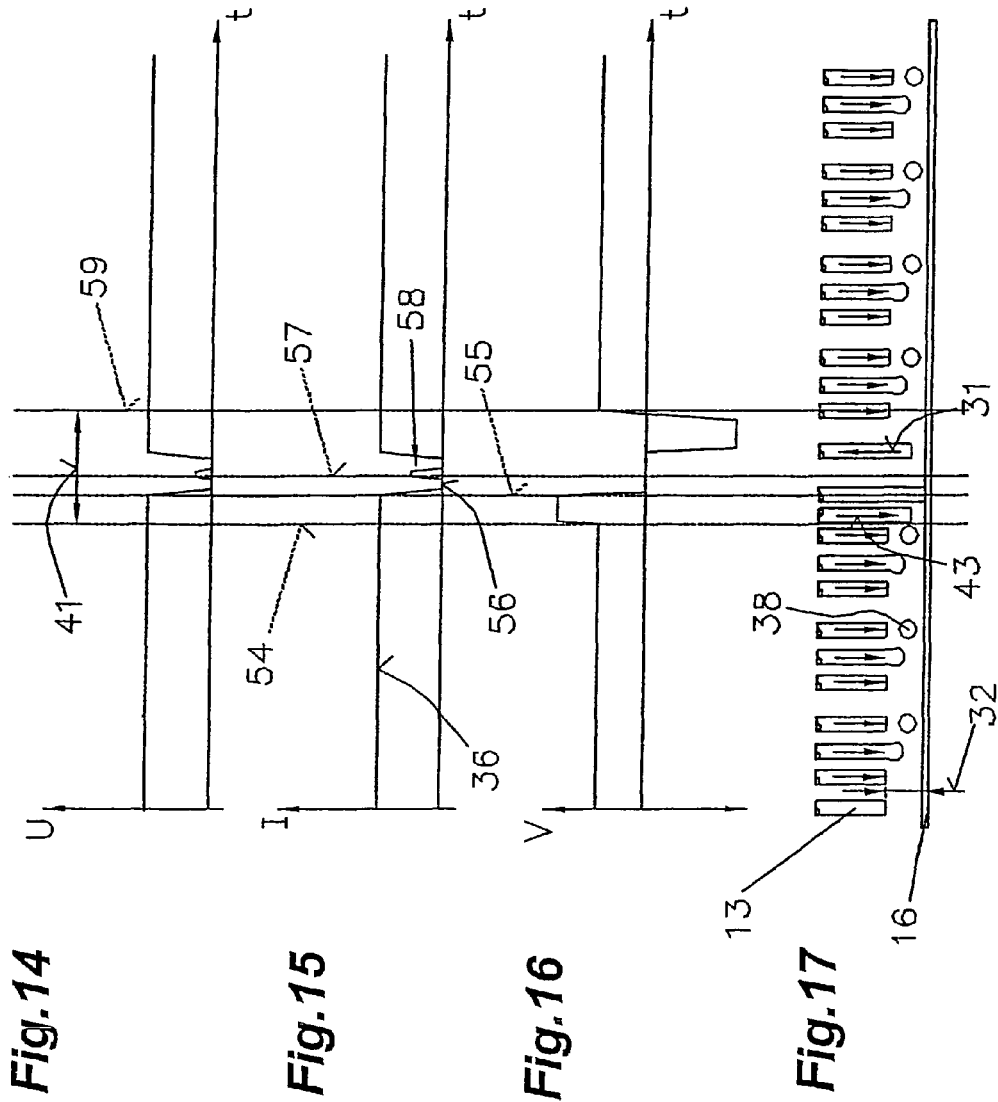

METHOD FOR CONTROLLING AND/OR ADJUSTING A WELDING PROCESS

CROSS REFERENCE TO RELATED APPLICATIONS

Applicant claims priority under 35 U.S.C. §119 of Austrian Application No. A 1687/2003 filed Oct. 23, 2003. Applicant also claims priority under 35 U.S.C. §365 of PCT/AT2004/000364 filed Oct. 21, 2004. The international application under PCT article 21(2) was not published in English.

The invention relates to a method for controlling a welding process, wherein a welding process adjusted on the basis of several different welding parameters and controlled by a control device and/or a welding current source is carried out after the ignition of an electric arc.

From EP 0 774 317 B1, a pulse arc welding method for welding by alternately feeding a pulse-like current and a base current via a consumable electrode and a base metal, respectively, is known. In that method, the length of the electric arc is controlled in a manner that the mean value or the integrated value of time corresponds to a set value. The base current is reduced at a higher mean value or integrated value of time, and increased at a smaller value. In addition, the feed times of the pulse and base currents can be reduced or increased as a function of the determined length of the electric arc. As a rule, the length of an electric arc and, hence, the distance of the end of the welding wire from the workpiece are determined by measuring the welding voltage and welding current and subsequent computation. Yet, the above-mentioned invention involves the disadvantage that the position or distance of the end of the welding wire from the workpiece cannot be precisely determined because of the most diverse influences encountered in a welding process.

It is, therefore, the object of the present invention to provide an above-defined method for controlling a welding process, which allows for the determination of the position or distance of the end of the welding wire from a workpiece.

This object is achieved in that at least one mechanical adjustment process is carried out during the welding process to determine the position of the welding wire, using the welding wire as a sensor. In doing so, the adjustment process can be initiated after one or several process phases of the welding process.

The advantage resides in that the position of the welding wire, or end of the welding wire, relative to the workpiece is mechanically determined, thus providing an accurate length regulation of the electric arc. The mechanical determination of the position largely prevents the adjustment procedure from being influenced by the welding process, whereby a very high accuracy will be obtained. With the methods known from the prior art for controlling a welding process, the position of the end of the welding wire can be calculated or measured only during the welding process, which involves an enormous control time delay and, moreover, yields only a "relative" result which does not allow the determination of the exact position of the end of the welding wire relative to the workpiece. An essential advantage of the present method resides in that this type of position determination can be implemented even if combinations of wire materials, gases etc. are used, with which the voltage of the electric arc does not behave proportionally to the length of the electric arc, thus rendering impossible the exact determination of the length of the electric arc by measurement or calculation. Moreover, movements of the electric arc on the workpiece may lead to a change in the length of the electric arc without changing the distance of the end of the welding wire from the workpiece, which would also adversely affect the accuracy of a calculation.

In the detection of the welding wire position according to the invention, only a very low control load of the control device is required for the determination of the distance. To start the welding process, i.e., to ignite the electric arc, a known method, for instance the so-called lift-arc principle, may be used.

The configuration according to an embodiment is advantageous, because it enables the absolute and accurate definition of the distance of the end of the welding wire from the workpiece. At a contact of the workpiece with the welding wire, a short-circuit is caused and recognized, whereby a value for the distance of the welding wire to the workpiece is set to zero. With this mode of detecting a position, no complicated voltage measurement, but just a very simple measurement of the voltage to recognize a short-circuit is required.

The configuration according to another embodiment is advantageous, because the welding wire, upon contacting, performs a defined rearward movement, i.e., a movement from the workpiece in the direction of the welding torch. Thus, a constant adaptation of the distance of the welding wire end relative to the workpiece to a defined set value is carried out without welding-process-related influences taking effect.

Another advantage resides in the configuration according to another embodiment, since the initiation of the mechanical adjustment process is either determined by the manufacturer, or set by the user, or even controlled by a trigger signal issued by different parameters during welding, whereby a correction of the distance to the defined set value is advantageously effected by frequent implementations of the adjustment process.

The configuration according to another embodiment is, however, also advantageous, because the welding process is only negligibly, if at all, delayed or interrupted by increasing the wire conveying speed during the adjustment process.

The configuration according to another embodiment is advantageous, since the adjustment process in a pulse welding process takes place in the base-current phase and, hence, between two pulse-current phases such that only a negligible disturbance of the pulse welding process will occur.

Another advantage is offered by the configuration according to another embodiment, since it renders feasible an identification of the length of the welding wire projecting out of the contact nozzle of the welding torch, which is also referred to as "stickout length", to be performed in addition to the positioning of the welding wire.

The configuration according to another embodiment is, however, also advantageous, because it readily enables the welding process to be continued after the mechanical adjustment process by newly igniting the electric arc.

The configuration according to another embodiment is advantageous to the effect that it enables the position of the welding wire end relative to the workpiece to be adjusted at a defined value, in particular a predetermined set value, at the start of welding or of a welding process, thus ensuring problem-free welding from the very beginning.

A further advantage is offered by the configuration according to another embodiment, because thereby another problem-free welding procedure can be started after the termination of a first welding procedure, since the position of the welding wire end relative to the workpiece has been detected and the results of this detection as well as of the detection of the length of the welding wire through which welding current passes are transmitted to a robot control.

The present invention will be explained in more detail by way of the attached drawings. Therein:

FIG. 1 is a schematic illustration of a welding machine or welding apparatus;

FIG. 2 illustrates the time history of the welding voltage during a variant embodiment of the method according to the invention;

FIG. 3 illustrates the time history of the associated welding current I;

FIG. 4 illustrates the associated time history of the wire conveying speed;

FIG. 5 illustrates the time history of the schematically represented position of the welding wire;

FIGS. 6 to 9 illustrate the time histories of the voltage U of the welding current I of the wire conveying speed V and the position of the welding wire as in accordance with a further exemplary embodiment of the method according to the invention;

FIGS. 10 to 13 illustrate the time histories of the welding voltage U of the welding current I of the wire conveying speed V and the schematic position of the welding wire as in accordance with a further exemplary embodiment of the method according to the invention; and FIGS. 14 to 17 illustrate the time histories of the welding voltage U of the welding current I of the wire conveying speed V and the schematic position of the welding wire as in accordance with a further exemplary embodiment of the present invention.

FIG. 1 depicts a welding apparatus 1, or welding installation, for various processes or methods such as, e.g., MIG/MAG welding or WIG/TIG welding, or electrode welding methods, double-wire/tandem welding methods, plasma or soldering methods etc.

The welding apparatus 1 comprises a power source 2 including a power element 3, a control device 4, and a switch member 5 associated with the power element 3 and control device 4, respectively. The switch member 5 and the control device 4 are connected to a control valve 6 arranged in a feed line 7 for a gas 8 and, in particular, a protective gas such as, for instance, carbon dioxide, helium or argon and the like, between a gas reservoir 9 and a welding torch 10 or torch.

In addition, a wire feeder 11 usually employed in MIG/MAG welding can be controlled by the control device 4, whereby an additional material or welding wire 13 is fed from a feed drum 14 or wire coil into the region of the welding torch 10 via a feed line 12. It is, of course, possible to integrate the wire feeder 11 in the welding apparatus 1 and, in particular, its basic housing, as is known from the prior art, rather than designing the same as an accessory device as illustrated in FIG. 1.

It is also feasible for the wire feeder 11 to supply the welding wire 13, or additional material, to the process site outside of the welding torch 10, to which end a non-consumable electrode is preferably arranged within the welding torch 10, as is usually the case with WIG/TIG welding.

The power required to build up an electric arc 15, in particular an operational electric arc, between the electrode and a workpiece 16 is supplied from the power element 3 of the power source 2 to the welding torch 10, in particular electrode, via a welding line 17, wherein the workpiece 16 to be welded, which is formed of several parts, is likewise connected with the welding apparatus 1 and, in particular, power source 2 via a further welding line 18, thus enabling a power circuit for a process to build up over the electric arc 15, or plasma jet formed.

To provide cooling of the welding torch 10, the welding torch 10 can be connected to a fluid reservoir, in particular a water reservoir 21, by a cooling circuit 19 via an interposed flow control 20, whereby the cooling circuit 19 and, in particular, a fluid pump used for a fluid contained in the water reservoir 21, is started as the welding torch 10 is put into operation so as to effect cooling of the welding torch 10.

The welding apparatus 1 further comprises an input and/or output device 22, via which the most different welding parameters, operating modes or welding programs of the welding apparatus 1 can be set and called, respectively. In doing so, the welding parameters, operating modes or welding programs set via the input and/or output device 22 are transmitted to the control device 4, which subsequently controls the individual components of the welding installation or welding apparatus 1 and/or predetermines the respective set values for controlling.

In the exemplary embodiment illustrated, the welding torch 10 is, furthermore, connected with the welding apparatus 1 or welding installation via a hose package 23. The hose package 23 accommodates the individual lines from the welding apparatus 1 to the welding torch 10. The hose package 23 is connected with the welding torch 10 via a coupling device 24, whereas the individual lines arranged in the hose package 23 are connected with the individual connections of the welding apparatus 1 via connection sockets or plug-in connections. In order to ensure an appropriate strain relief of the hose package 23, the hose package 23 is connected with a housing 26, in particular the basic housing of the welding apparatus 1, via a strain relief means 25. It is, of course, also possible to use the coupling device 24 for connection to the welding apparatus 1.

It should basically be noted that not all of the previously mentioned components will have to be used or employed for the various welding methods or welding apparatus 1 such as, e.g., WIG devices or MIG/MAG apparatus or plasma devices. Thus, it is, for instance, feasible to devise the welding torch 10 as an air-cooled welding torch 10.

FIGS. 2 to 5 depict the time histories of the welding voltage U of the welding current I of the wire conveyance speed V and the position of the welding wire according to one embodiment of the method of the invention. This example will be explained by way of a pulse welding process.

A starter phase 27 of the illustrated pulse welding process is performed according to the so-called "lift arc principle". In this contact ignition method, the welding wire 13 is placed on the workpiece 16 and subsequently slightly lifted after connection of the welding current I, whereby an electric arc 15 is ignited. To start the pulse welding process, i.e., actuate the caliper of the welding torch 10 for the first time, a limited welding voltage U is applied (cf. time 28). Simultaneously with the application of the welding voltage U, the welding wire 13 is moved in the direction of the workpiece 16 in the sense of arrow 29. A contact of the welding wire 13 with the workpiece 16 causes a short-circuit to be formed at time 30, thus causing the welding voltage U to break down. This is recognized by the control device 4 of the welding apparatus 1, whereupon the welding current I is increased to such a limited extent as to avoid incipient melting of the welding wire 13. After this, the wire conveyance is reversed, i.e., the welding wire 13 is moved away from the workpiece 16 in the sense of arrow 31. As the welding wire 13 is lifted off the workpiece 16, an electric arc 15 is ignited by the applied current I. In doing so, it is possible to again increase the welding current I during the rearward movement of the welding wire 13 in order to keep the electric arc 15 in a better and stabler upright position at an extended length of the electric arc, i.e., at a larger distance between the end of the welding wire and the workpiece 16. The welding wire 13 is moved back into a base position at a predefined distance 32 from the workpiece 16. This distance 32 can be defined by the user or fixedly adjusted.

After having reached said initial position, the starting phase 27 is completed, and the welding process proper, for instance a pulse welding process, starts at time 33. The pulse welding is alternately formed by a pulse current phase 34 and a base current phase 35, with a drop detachment from the welding wire 13 occurring at every pulse current phase 34. The welding voltage U and/or the welding current I in the base current phase 35 are maintained at a base value 36 at which the electric arc 15 is kept upright and the welding wire 13 is moved towards the workpiece 16. In the pulse current phase 34, the welding current I is increased to a particular value 37 for a predetermined period of time 38, whereby a droplet 39 is formed on the end of the welding wire and a droplet detachment takes place, as is, for instance, visible at time 40. After the detachment of the droplet 39, the pulse current phase 34 is completed and again followed by a base current phase 35.

Since it is no longer feasible, after several droplet detachments, to precisely determine how much of the welding wire 13 has melted, the position of the end of the welding wire 13 cannot be precisely determined. In order to be able to determine or detect or newly adjust the precise position of the welding wire 13, a mechanical adjustment process 41 is carried out during the welding process, namely, for instance, between two pulse current phases 34 during pulse welding, it being feasible to carry out one or several adjustment processes 41 after one or several process phases 34. The mechanical adjustment process 41 uses the welding wire 13 as a sensor. In this exemplary embodiment, the mechanical adjustment process 41 is, thus, carried out in a short-circuit-free welding process and, in particular, a pulse welding process, with the mechanical adjustment process 41 being realized after every third pulse current phase 34. Naturally, the adjustment process 41 can also be performed in combination with short-circuit-afflicted welding processes and, in particular, short-arc welding processes.

The mechanical adjustment process 41 is used to detect the position of the welding wire 13 and, in particular, the distance 32 of the end of the welding wire from the workpiece 16, and/or to effect a correction or new adjustment to a predetermined set value, of the distance 32 of the end of the welding wire from the workpiece 16.

The mechanical adjustment process 41 is performed in the base current phase 35, whereby it is ensured that no droplet 38 will form on the end of the welding wire and, hence, no or only little melting of material, or material transfer, onto the workpiece 16 will occur. The mechanical adjustment process 41 is realized in a manner that the welding wire 13 is moved towards the workpiece 16 in the sense of arrow 29 until contacting the workpiece 16. At a contacting of the welding wire 13 with the workpiece 16, a deliberately controlled short-circuit is thus formed, which is recognized by the control device 4, with the elimination of the short circuit during the mechanical adjustment process being suppressed by the control device by a current increase. The control device 4 detects the exact position of the end of the welding wire relative to the workpiece 16, which is zero at a short-circuit. From this starting position of the welding wire 13 at a short-circuit, the welding wire 13 is moved away from the workpiece 16 as far as to a given distance 32. This can be effected in that the rearward movement is effected through a detection of the actual value of the wire using, for instance, an incremental sensor, so that the end of the welding wire is conveyed to a particular distance 32 by a set/actual value comparison. It is, of course, also possible to reach a predetermined position or predetermined distance 32 of the welding wire end by a simple time default for the rearward movement, since always the same position will be reached again on account of the defined conveying speed and time default. In addition, it is, of course, also possible to use the position of the end of the welding wire, or the course of the rearward movement, or the set distance between the workpiece 16 and the end of the welding wire, as in accordance with various other methods. It is also possible to move the welding torch to the workpiece and back again during the mechanical adjustment process 41.

In order to keep the temporal interruption of the welding process by the mechanical adjustment process 41 short, the welding wire 13, during the adjustment process 41, at time 42 is preferably conveyed to the workpiece 16 at a higher wire conveying speed corresponding to arrow 43 during the welding process (corresponding to arrow 29 in the pulse current phase 34 and base current phase 35). In doing so, the electric arc 15 is preferably maintained while avoiding incipient melting of the welding wire 13, i.e. droplet formation. Hence, no or only little material introduction from the welding wire 13 into the workpiece 16, i.e. into the melt bath, will take place during the mechanical adjustment process 41. An increase in the wire advance speed V may also be effected at a rearward movement of the welding wire 13. This means that the welding current I and the welding voltage U remain unchanged relative to the base current phase 35 during the mechanical adjustment process 41, yet the conveying speed V of the welding wire 13 is increased, as is apparent from FIG. 4. It is, of course, possible to effect a reduction or interruption of the welding current I or welding voltage U in order to effectively prevent incipient melting of the welding wire 13.

Via a short-circuit detection means, the control device 4 recognizes the short circuit occurring during the mechanical adjustment process 41, whereupon the control device 4 will reset to zero the distance 32 of the end of the welding wire. After contacting at time 42, the conveying direction of the welding wire 13 is reversed into a rearward movement and the welding wire 13 is conveyed back to a fixedly pregiven or adjustable distance 32. To this end, the distance 32 preferably ranges between 2 mm and 6 mm. After having reached the distance 32, the mechanical adjustment process 41 is completed at time 44, and the welding process is continued while the wire conveying direction is again reversed in the direction towards the workpiece 16.

In order to ensure the re-ignition of the electric arc 15 during the mechanical adjustment process 41, it is necessary to provide a sufficiently high welding current I after the short circuit such that a new electric arc 15 will be formed as the welding wire 13 is lifted off the workpiece 16. It is, however, also possible to re-ignite the electric arc 15 after the mechanical adjustment process 41 only when the distance 32 is reached. This may, for instance, be effected by HF ignition.

The implementation and time of initiation of the adjustment process 41 can be arbitrarily set by the user. In doing so, the definition of the time of the mechanical adjustment process 41 can, for instance, be effected by indicating the number of pulse current phases 34 or by predetermining a time interval. It is, of course, also possible that the adjustment process 41 occurs at fixedly pregiven times. In addition, it is feasible to initiate the adjustment process 41 through a trigger signal. This may, for instance, be realized by monitoring the welding voltage U, with a trigger signal being issued as a defined welding voltage threshold value is exceeded or fallen short of and the mechanical adjustment process 41 being started by the control device.

The mechanical adjustment process 41 is carried out to determine the distance 32 of the end of the welding wire from the workpiece, and/or to correct or newly position the welding wire 13. By the mechanical adjustment process 41, a defined distance 32 of the position of the welding wire relative to the workpiece 16 is repeatedly adjusted to thereby prevent in a longer-lasting welding process that the welding wire 13 burns back to the contact tube at a wire conveying speed V that is too low, or that the length of the electric arc is constantly reduced at a wire conveying speed V that is too high.

The great advantage of the mechanical adjustment process 41 resides in that the mechanical adjustment process 41 is independent of the welding process. The determination of the position of the welding wire, thus, takes place independently of the used materials, gases and other welding parameters at which the voltage of the electric arc behaves unproportionally to the length of the electric arc. In such a case, the determination of the length of the electric arc would not be feasible through electric arc voltage measurement. Besides, the constant occurrence of changes in the length of the electric arc due to movements of the electric arc 15 on the workpiece 16 would cause problems, if the length of the electric arc were determined through the voltage of the electric arc.

As in contrast to the exemplary embodiment according to FIGS. 2 to 5, a mechanical adjustment process 41 is carried out after every pulse current phase 34 in the further exemplary embodiment according to FIGS. 6 to 9.

The starting phase of the pulse welding process is described in preceding FIGS. 2 to 5, therefore it will not be described in detail and illustrated any more.

Following the starting phase for the first-time ignition of the electric arc 15, the welding wire 13 performs a continuous movement in the direction to the workpiece 16 according to arrow 29. During the pulse current phase 34, the welding current I is increased at time 45 to induce droplet formation. Droplet detachment occurs after a period 38, and then the pulse current phase is completed. The mechanical adjustment process 41 is performed in the base current phase 35 following thereupon.

At the beginning of the mechanical adjustment process 41, i.e. at time 46, the wire advance speed V is increased according to arrow 43 and the welding wire 13 is conveyed until contacting the workpiece 16 at time 47. The intensity of the welding current I during the mechanical adjustment process 41 is adjusted to induce only as reduced an incipient melting of the welding wire as possible, without drop formation. After the short circuit in the mechanical adjustment process 41 has been recognized by the control device 4 via a short-circuit detection means and the control device 4 has reset the value for the distance 32 of the welding wire 13 to zero, the welding wire 13 is again moved back in the sense of arrow 31 until a defined distance 32 will have been reached, whereupon a reversal of the wire conveying direction will again take place. After this, the next pulse current phase 34 is initiated. A great advantage of this exemplary embodiment resides in that the distance 32 of the end of the welding wire from the workpiece 16 is very quickly corrected and, hence, kept constant in the event of distance changes of the welding torch 10 relative to the workpiece 16, as is common with manual welding or in robotic applications when welding over workpiece steps. For instance, with common manual welding as known from the prior art using a pulse welding process, a timing of 20 to 70 Hertz per second is used. The user is, thus, not compelled to carry out a uniform movement of the welding torch 10.

With a manual welding process in which a reciprocating movement involving a permanent change of the distance of the welding torch 10, or the end of the welding wire from the workpiece 16, is carried out, improved welding is to be reached by the same advantage.

A further exemplary embodiment of a welding process and, in particular, pulse welding process is represented in FIGS. 10 to 13.

Having been explained in the exemplary embodiment according to FIGS. 2 to 5, the starting phase of the welding process will again not be referred to in detail.

The welding current I in this exemplary embodiment is controlled at a pregiven, constant value during the welding process such as, for instance, a spray arc welding process. The applied current I causes the formation of a droplet chain 48 on the end of the welding wire. After a period of time previously adjusted by the user, the mechanical adjustment process 41 is performed at time 51. In doing so, the welding current I is lowered to a base value 36 during the mechanical adjustment process 41 such that no further material transfer will take place. The base value 36 is chosen such that slight incipient melting of the end of the welding wire will occur in order to prevent sticking of the welding wire 13 to the workpiece 16. At the same time, the welding wire 13 is conveyed in the direction of the workpiece 16 at an elevated wire conveying speed V until it contacts the workpiece 16. Due to the short circuit resulting from said contact at time 52, the welding voltage U breaks down. The short circuit in the mechanical adjustment process 41 is recognized by the control device 4, whereupon the control device 4 sets the value of the distance 32 of the end of the welding wire relative to the workpiece 16 to zero. The welding wire 13 then performs a rearward movement in the sense of arrow 31, i.e. a movement from the workpiece 16 towards the welding torch 10, until distance 32 is reached. The welding current I is again raised to the default value, and the mechanical adjustment process 41 is completed at time 53, with the welding process starting anew or being further continued.

By way of the exemplary embodiment according to FIGS. 14 to 17, a further variant is described, in which the length of the welding wire 13 through which welding current I flows is measured during the mechanical adjustment process 41. The mechanical adjustment process 41 starts approximately at time 54 and ends at time 59. This is of relevance to the extent that this measured wire length has a substantial influence on the welding process, thus enabling an adaptation of the parameters for the welding process. This is effected in a manner that, after the occurrence of the short circuit, which takes place at time 55, a predefined measuring current 58 is applied, for instance at time 57, over a given period of time and the voltage U is measured at that time on the welding wire 13. From this, the control device 4 calculates the overall resistance. Based on the known specific resistance of the welding wire 13, the length of the welding wire 13 through which welding current flows is subsequently calculated by the control device 4. In doing so, the specific resistance can be directly input or read from a memory by the control device 4 by selecting the material of the welding wire 13.

It is also possible to carry out the mechanical adjustment process 41 prior to performing the welding process. Another option is to carry out the mechanical adjustment process 41 at the end of the welding process so as to enable the adjustment of a defined distance 32 of the end of the welding wire from the workpiece 16, or end of the contact tube, for the subsequent welding process. It is, thus, safeguarded that the distance 32 of the end of the welding wire from the contact tube of the welding torch 10 is known at the start of a subsequent or following welding procedure. The result of the mechanical adjustment process 41 and the determination of the length of the welding wire 13 through which the welding current flows can, furthermore, also be transmitted to a robot control.

The invention claimed is:

1. A method for controlling a welding process using a melting welding wire and a welding torch comprising the steps of:
   (a) igniting an electric arc;
   (b) subsequently conducting welding, the welding being adjusted on the basis of several different welding parameters and controlled by at least one of a control device and a welding current source; and
   (c) carrying out at least one mechanical adjustment process during the welding to determine the position of the welding wire using the welding wire as a sensor;
   wherein, during the at least one mechanical adjustment process, the welding torch is maintained in position and the welding parameters are controlled in a manner that no or only little welding wire material melting is effected;
   wherein, during the at least one mechanical adjustment process, contacting of the welding wire with a workpiece is effected by moving the welding wire towards the workpiece; and
   wherein, after contacting of the welding wire with the workpiece, the welding wire is moved away from the workpiece to a fixedly pregiven or adjustable distance relative to the workpiece.

2. The method according to claim 1, wherein, during the movement of the welding wire towards the workpiece, the welding parameters are controlled in a manner that the electric arc is maintained until immediately before the contacting of the welding wire with the workpiece while avoiding melting of the welding wire.

3. The method according to claim 1, wherein the welding wire is moved back after contacting with the workpiece.

4. The method according to claim 1, wherein said distance is determined via the welding voltage (U), the welding current (I) or the time (t) during the movement of the welding wire.

5. The method according to claim 1, wherein the at least one mechanical adjustment process is initiated by settings selected by the user or by fixed defaults.

6. The method according to claim 1, wherein the at least one mechanical adjustment process is initiated by a trigger signal.

7. The method according to claim 1, wherein the at least one mechanical adjustment process is initiated at defined times, after expiration of defined time intervals or after expiration of a defined number of welding process pulses.

8. The method according to claim 1, wherein the welding wire is advanced at a welding wire advance speed (V) and the welding wire advance speed is increased during the at least one mechanical adjustment process.

9. The method according to claim 1, wherein the at least one mechanical adjustment process is carried out during a base current phase of the welding.

10. The method according to claim 1, wherein the welding wire has a length through which welding current flows and said length is measured during the at least one mechanical adjustment process.

11. The method according to claim 1, wherein the electric arc is newly ignited during the at least one mechanical adjustment process as the welding wire is lifted off the workpiece.

12. The method according to claim 1, wherein the electric arc is newly ignited during the at least one mechanical adjustment process as the desired distance is reached.

13. The method according to claim 1, wherein the at least one mechanical adjustment process is carried out at the beginning of the welding.

14. The method according to claim 1, wherein the at least one mechanical adjustment process is carried out at the end of the welding so as to enable the adjustment of a defined distance of the end of the welding wire relative to the workpiece for the subsequent welding.

15. The method according to claim 1, wherein the position of the welding wire determined during the at least one mechanical adjustment process is transmitted to a robot control.

16. The method according to claim 1, wherein contacting of the welding wire with the workpiece is detected when a short circuit is recognized.

17. The method according to claim 16, wherein, after the detection of said contacting, the end of the welding wire is reset to a zero position.

* * * * *